United States Patent [19]

Heinemann

[11] Patent Number: 4,774,062

[45] Date of Patent: Sep. 27, 1988

[54] CORONA DISCHARGE OZONATOR

[75] Inventor: Klaus W. Heinemann, Sunnyvale, Calif.

[73] Assignee: Alten Corporation, Palo Alto, Calif.

[21] Appl. No.: 2,807

[22] Filed: Jan. 13, 1987

[51] Int. Cl.⁴ ............................................. C01B 13/11
[52] U.S. Cl. ......................... 422/186.19; 422/186.18; 422/186.07; 422/907
[58] Field of Search ...................... 422/186.07, 186.18, 422/186.19, 186.2, 907; 204/176

[56] References Cited

U.S. PATENT DOCUMENTS

| | | |
|---|---|---|
| 3,798,457 | 3/1974 | Lowther . |
| 3,836,786 | 9/1974 | Lowther . |
| 3,891,561 | 6/1975 | Lowther . |
| 3,899,683 | 8/1975 | Lowther . |
| 3,903,426 | 9/1975 | Lowther . |
| 3,984,697 | 10/1976 | Lowther . |
| 3,996,474 | 12/1976 | Lowther . |
| 4,213,838 | 7/1980 | Lowther . |
| 4,351,859 | 9/1982 | Hartmann . |

FOREIGN PATENT DOCUMENTS

| | | | |
|---|---|---|---|
| 160964 | 5/1984 | European Pat. Off. | ........ 422/186.07 |
| 202501 | 5/1985 | European Pat. Off. | ........ 422/186.07 |
| 3128746 | 2/1983 | Fed. Rep. of Germany | ........................ 422/186.07 |
| 1103095 | 3/1975 | Japan | ............................. 422/186.07 |
| 56-15004 | 12/1981 | Japan | ............................. 422/186.07 |
| 0260402 | 12/1985 | Japan | ............................. 422/186.07 |
| 1136187 | 12/1968 | United Kingdom . | |

*Primary Examiner*—John F. Terapane
*Assistant Examiner*—Susan Wolffe
*Attorney, Agent, or Firm*—Majestic, Gallagher, Parsons & Siebert

[57] ABSTRACT

A durable, efficient and relatively inexpensively manufactured ozonator is provided, which operates on the corona discharge principle and can be utilized to produce about 0.5 to about 2.25 kg of ozone per day at a favorable overall cost. A corona discharge ozonator embodiment includes an inner and outer electrode in a concentric relationship. At least one, preferably both, of the electrodes has a multi-layered porcelain coating bonded by individually applied and fired layers and with a total thickness of between 0.5 mm to 1.0 mm.

11 Claims, 2 Drawing Sheets

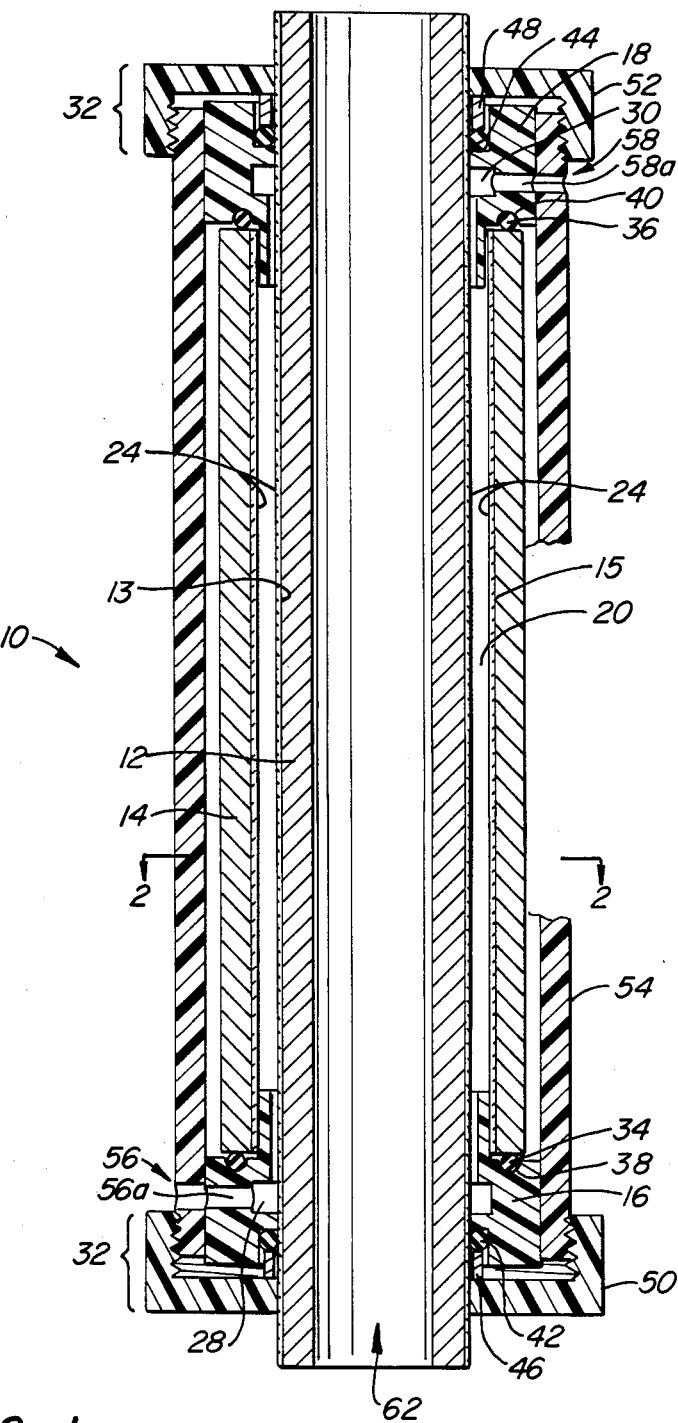
FIG._1.

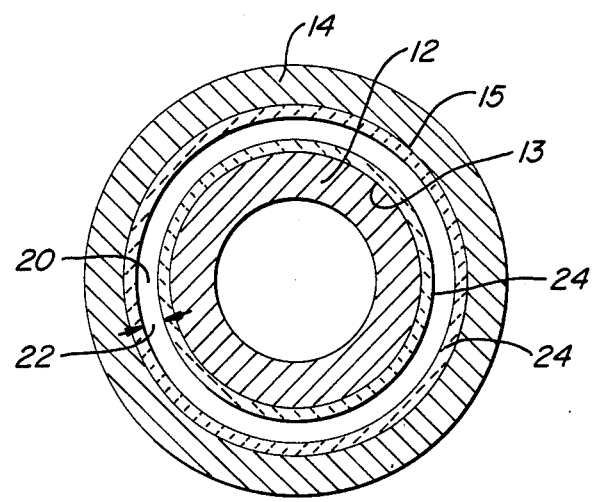
FIG._2.

CORONA DISCHARGE OZONATOR

FIELD OF THE INVENTION

The present invention generally relates to an apparatus by which a gas mixture containing molecular oxygen can be enriched with ozone, and more particularly relates to an ozonator operating on the corona discharge principle.

BACKGROUND OF THE INVENTION

Ozone is a an excellent oxidizing agent and is highly destructive to many microorganisms, such as bacteria, fungi and algae. Thus, ozone has found uses in water purification, sterilization and deodorization. In many applications, ozone is more effective than chlorine, while the oxidation product of ozone is typically a harmless and environmentally acceptable gas, such as carbon dioxide or water. However, the high cost and lack of long-term reliable ozone producing equipment has retarded the widespread use of ozone in many commerical applications.

Apparatus generating ozone are sometimes called "ozonators". In a typical corona discharge ozonator, the electrodes are made of aluminum, copper, steel or stainless steel. The dielectric is usually glass, titanium dioxide or alumina, and is eithter attached to one of the electrodes or positioned in close proximity to it. An ozonator design problem has been failure of the dielectric due to mechanical pressure, thermal stresses, high voltage breakdowns, or corrosive attack of the opposing metal electrode. As a consequence, typical corona discharge ozonators have had relatively thick dielectric layers which are disadvantageous in lowering the ozone yields. For example, glass electrode ozonators have typically had a dielectric coating thickness exceeding 2.5 mm (100 mils).

Extremely thin dielectric materials have been suggested for corona discharge ozonators. Thus, U.S. Pat. Nos. 3,984,697, issued Oct. 5, 1976, 3,996,474, issued Dec. 7, 1976, and 3,891,561, issued June 24, 1976, all inventor Lowther, disclose porcelain enamel coatings on electrodes as dielectric material with a thickness on each electrode surface being less than 20 mils (less than 0.5 mm). The Lowther dielectric is formed from a frit with a high titanium content. High titania dielectric materials are relatively expensive and require an increased firing temperature.

Accordingly, there is a need for a durable, efficient and relatively low cost ozone generator, operating on the corona discharge principle, which can produce about 1 to about 5 lbs. (about 0.45 to 2.25 kg) of ozone per day at a favorable overall cost.

SUMMARY OF THE INVENTION

In one aspect of the present invention, a corona discharge ozonator is provided comprising a plurality of spaced apart electrodes, at least every other electrode having a porcelain coating. In a preferred embodiment, an inner and an outer electrode are in a radially spaced apart, concentric relationship, and define a gap therebetween. At least one of the inner and outer electrodes has a porcelain coating bonded thereto. The porcelain coating contains less than about 3 wt. % titanium dioxide, more preferably no titanium dioxide, has a thickness between 0.5 mm and 1.0 mm and is multilayered.

The porcelain coating forms a tight, durable mechanical bond with its electrode substrate, and is formed from about 3–5 individually fired layers to result in a coating with a high voltage breakdown point, which is considerably higher than the applied voltage. This characteristic in turn greatly reduces the required precision and cost of the power supply for the ozonator.

The AC power source preferably is operated at a frequency between about 50 and 2,000 cps and preferably has a voltage output between about 6,000 and 15,000 volts. The gap between the electrodes is 1–3 mm, wherein the gap is selected to be about 1 mm per 5,000 volts applied. External cooling, such as by water or oil, is preferably applied to the inner surface of the inner electrode or to the outer surface of the outer electrode, or both.

An ozonator in accordance with the invention may be operated to produce about 1 to about 5 pounds of ozone per day, preferably at a power transmission of about 1 watt/in$^2$, and provides excellent durability.

BRIEF DESCRIPTION OF THE DRAWINGS

In the drawings:

FIG. 1 is a longitudinal cross-section of a corona discharge ozonator embodiment of the invention, partially broken away; and FIG. 2 is a cross-sectional view taken along line 2—2 of FIG. 1.

DETAILED DESCRIPTION OF THE PREFERRED EMBODIMENT

Referring to FIG. 1, a corona discharge ozonator 10 of the invention comprises an inner electrode 12 and an outer electrode 14. Inner and outer electrodes 12, 14 are substantially cylindrical, are in a concentric relationship, and are electrically isolated from each other by means such as insulating spacers 16, 18. Insulating spacers 16, 18 are made of an ozone-compatible, high voltage insulation material such as, for example, polyvinylfluoride (PVF) or polyvinylchloride (PVC).

Inner and outer electrodes 12, 14 are made of an electrically conducting material, preferably metal tubes, such as stainless steel, low carbon steel, copper or the like. Inner electrode 12 preferably has an O.D. of about 20–50 mm, and the I.D. of outer electrode 14 must be sufficiently larger than the O.D. of inner electrode 12 as to define a gap 20 therebetween of an annular width hereinafter further described. Outer electrode 14 preferably longitudinally extends about 500–1,000 mm and the length of gap 20 is typically slightly shorter.

At least one of the inner and outer electrodes 12, 14 has a multilayered porcelain coating 24. Preferably, the facing surface 13 of the inner electrode 12 and the facing surface 15 of outer electrode 14 both bear the porcelain coating 24. However, the thickness of each porcelain coating with respect to the other does not need to be the same so long as neither is less than 0.5 mm thick, if present.

Turning to FIG. 2, the annular width 22 of gap 20 is defined between the porcelain coatings 24 on facing surfaces 13, 15. Each porcelain coating 24 must be between 0.5 mm and 1.0 mm thick and be of a material having a dielectric constant greater than about 6. Each porcelain coating 24 consists essentially of 3 to 5 layers, and each layer is about 0.2 mm thick. The layer most closely adjacent the facing surface 13 or 15 defines a base layer, and this base layer must include clay in a sufficient amount to increase adherence of the procelain coating to the facing surface 13 or 15 during the wet process, or vacuum dip coating, preparation and after high temperature firing. More preferably, all layers forming the porcelain coating 24 include clay.

Each layer of porcelain coating 24 is individually applied and fired at a temperature between about 700° C. and 900° C. The porcelain coating 24 contains from about 0 wt. % to less than 3 wt. % titanium dioxide, more preferably 0 wt. % titanium dioxide, and is designed to have substantially no grain boundaries which could lead to high voltage short circuit paths. Porcelain coating 24 has only small (less than 0.1 mm diameter) voids, or gas inclusions.

The compositions used to prepare each layer may be the same or different, and various compositions are suitable. A typical, suitable material for preparing the layers of porcelain coating 24 by forming an aqueous slurry, coating and firing, can be commercially purchased as a powder from suitable suppliers, such as, for example, from Bayer AG, Leverkusen, West Germany (as Email RF), which includes clay, bentonite, potash, sodium aluminate and chromium oxide.

Application techniques and apparatus suitable for forming porcelain coatings 24 are known to the art and are described, for example, by U.K. Pat. No. 1,136,187, dated Nov. 14, 1967 and U.S. Pat. No. 4,351,859, issued Sept. 28, 1982, inventor Hartmann, which are incorporated herein by reference. Thus, for example, U.S. Pat. No. 4,351,859 describes a process for enameling the inside surface of hollow vessels, which have two openings at opposite points. The porcelain coating on the facing surface 15 of the outer electrode 14 is preferably applied by vacuum dipping, as described in said U.S. patent. The U.K. patent describes a process for enameling the outer (as well as inner) surface, which is suitable for coating the facing surface 13 of inner electrode 12.

Each layer is individually applied and fired before application of the next. The high voltage break-down strength of each layer is greater than about 5600 volts, figuring 0.2 mm per layer thickness. The three to five layers forming porcelain coating 24 assure that an impurity in one layer will have an extremely low probability of representing a weak area for the entire porcelain coating 24 during normal operation of the ozonator 10, and provide for durable and long-term use.

A conventional power source (not illustrated) is in electrical communication with the inner and outer electrodes and is of sufficient construction to apply an alternating current high voltage to the inner and outer electrodes. A suitable power source has a voltage output capacity between about 6,000 and 15,000 volts, most typically at about 10,000 volts, and is operable at a frequency between about 50 and 2,000 cps. Referring to FIG. 2, the annular width 22 of gap 20 must be less than about 1 mm per 3,000 volts applied, at which condition a self-sustained discharge is normally obtained. More preferably, gap 20 is about 1 mm per 5,000 volts applied.

Turning to FIG. 1, gap 20 longitudinally extends between an annulus 28 formed by spacer 16 at one end and an annulus 30 formed in spacer 18 at the other end. That is, the length of gap 20 forms the flow path along which flowing oxygen-containing gas will have ozone formed therein during operation of the ozonator 10. Annuluses 28, 30 are of larger width than annular width 22, to facilitate diffusion into gap 20 and even flowing of gas along gap 20.

Means 32 for containing a gas within gap 20, while permitting the gas to flow from annulus 28 through gap 20 to annulus 30, preferably includes O-rings 34, 36 disposed in grooves 38, 40 of annuluses 28, 30, respectively, and O-rings 42, 44 seated between the facing surface 13 of inner electrode 12 and respective spacers 16, 18, which are compressed by compression rings 46, 48 via caps 50, 52. Caps 50, 52 are preferably threaded, and may be screw fit onto a correspondingly threaded pipe 54 surrounding the outer electrode 14 (shown as partly broken away in FIG. 1). Caps 50, 52 and pipe 54 are formed of an electrically insulating material, such as PVC, for high voltage protection. O-rings 34, 36 and 42, 44 are made of an ozone compatible material such as Viton fluoroelastomer (Viton is a trademark of DuPont de Nemours).

Containing means 32 provides an air-tight seal for gas flowing through gap 20, while permitting substantially unrestricted flow between inlet 56 and outlet 58. Gap 20 is in fluid communication with inlet 56, via passageway 56a traversely through one side of pipe 54 and spacer 16, and outlet 58, via passageway 58a traversely passing through one side of pipe 54 and spacer 18. Passageways 56a and 58a are in fluid communication with annulus 28 and 30, respectively.

The corona discharge ozonator preferably includes a means for cooling the air flowing through gap 20 during operation. The cooling means must be sufficient to maintain the temperature of gas flowing through gap 20 during operation to below about 100° F. (37.8° C.) since ozone decomposes at increasingly intolerable rates at elevated temperatures. For example, the cooling means may be by grounding inner electrode 12 and flowing ambient temperature water through a longitudinally extending passageway 62 within inner electrode 12. Passageway 62 is sufficiently adjacent gap 20 for heat transfer. Water as the cooling agent is preferred due to its high heat capacity. Alternatively, the cooling means may be constructed to cool the outer electrode 14, such as by an electrically insulated outer mantle (not illustrated). In either instance heat is extracted radially from gap 20.

In operation, an oxygen containing gas, preferably air, which has been dried by conventional means to remove water vapor, is introduced through inlet 56 into annulus 28. The gas may be caused to flow through gap 20 by pumping adjacent inlet 56, or by pulling a slight vacuum adjacent outlet 58. The gas fills annulus 28 and flows evenly through gap 20, preferably at a typical flow rate between about 1 to 2 CFM per rated pound of ozone, and at an operating pressure of about 10 to about 30 psi, more preferably at about atmospheric pressure.

The ozonator 10 is preferably operated at a power transmission of about 1 watt/in$^2$, which provides a significant margin of error with regard to impurity-induced high voltage breakdowns. Flaking of the porcelain coating is avoided in the present invention because only one side of each electrode is coated. If both sides were coated, hydrogen gas in the electrode could cause pressure bubbles during operation. Thus, the inventive ozonator is relatively inexpensively manufactured, has good efficiency characteristics, and excellent durability.

While the invention has been described in connection with specific embodiments thereof, it will be understood that it is capable of further modifications, and this application is intended to cover any variations, uses or adaptations of the invention following, in general, the principles of the invention and including such departures from the disclosure as come within the known or customary practice in the art to which the invention pertains and as may be applied to the essential features hereinbefore set forth, and as fall within the scope of the invention and the limits of the appended claims.

It is claimed:

1. A corona discharge ozonator comprising:
   an inner and an outer electrode, the inner and outer electrodes in a concentric relationship with facing surfaces and defining a gap therebetween, at least one of the inner and outer electrodes having a porcelain coating bonded thereto on a facing surface thereof, the porcelain coating containing less than about 3 wt. % titanium dioxide, being between 0.5 mm and 1.0 mm thick, and having a dielectric constant greater than about 6;
   means for applying an alternating current high voltage to the inner and outer electrodes; and
   means for flowing an oxygen containing gas through the gap.

2. The ozonator as in claim 1 wherein each of the inner and outer electrode facing surfaces has said porcelain coating.

3. The ozonator as in claim 1 wherein
   the inner and outer electrodes are substantially cylindrical, and the gap has an annular width of about 1 mm per 5,000 volts applied.

4. The ozonator as in claim 1 or 2 wherein the porcelain coating is formed by 3 to 5 layers, has substantially no grain boundaries and each layer is about 0.2 mm thick.

5. The ozonator as in claim 4 wherein the porcelain coating contains substantially no titanium dioxide, the layer most closely adjacent the facing surface defines a base layer, and the base layer includes clay in a sufficient amount to increase adherence of the porcelain coating to the facing surface.

6. The ozonator as in claim 1 wherein one of the inner and outer electrodes is electrically grounded and includes means for cooling the electrically grounded electrode.

7. The ozonator as in claim 6 wherein the cooling means is adapted to maintain a gas temperature within the gap below about 38° C. and is by a liquid cooling agent.

8. The ozonator as in claim 3 wherein the cylindrical inner electrode defines a longitudinally extending passageway, the inner electrode is electrically grounded, and the passageway is of sufficient construction to contain a flowing liquid cooling agent adjacent the gap.

9. The ozonator as in claim 3 wherein the outer electrode includes means for cooling the outer electrode, the cooling means including an electrically insulated outer mantle.

10. The ozonator as in claim 3 wherein the high voltage applying means has a voltage output capacity between about 6,000 volts and 15,000 volts.

11. The ozonator as in claim 4 wherein the total thickness of one porcelain coating is different from the total thickness of the other porcelain coating.

* * * * *